June 7, 1938. J H. HUNT ET AL Re. 20,750
VEHICLE WHEEL
Original Filed June 30, 1932 2 Sheets-Sheet 1
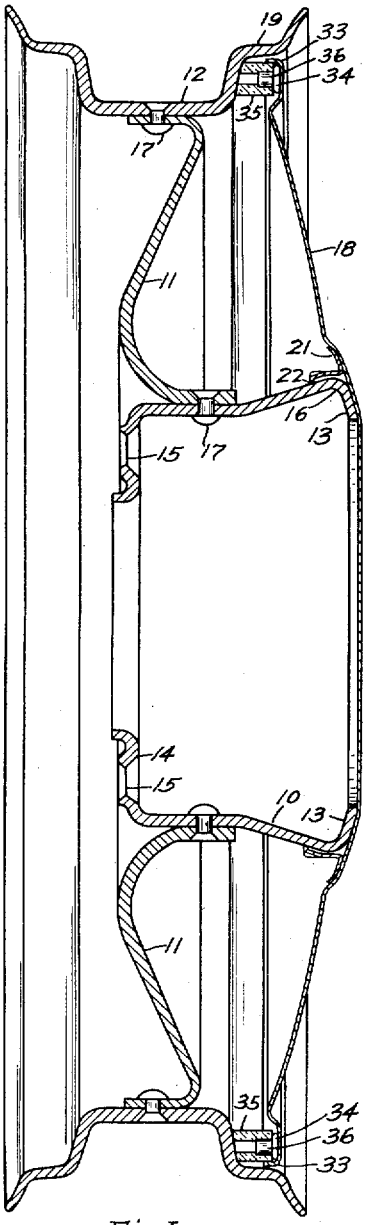
Fig. I
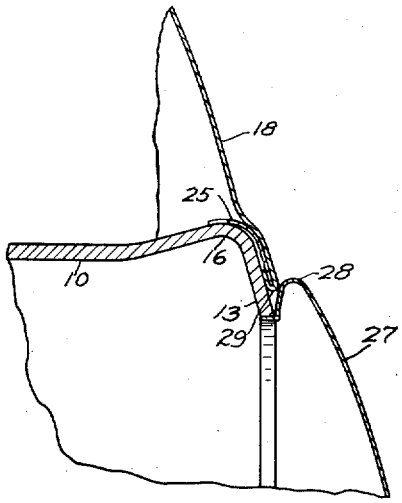
Fig. V
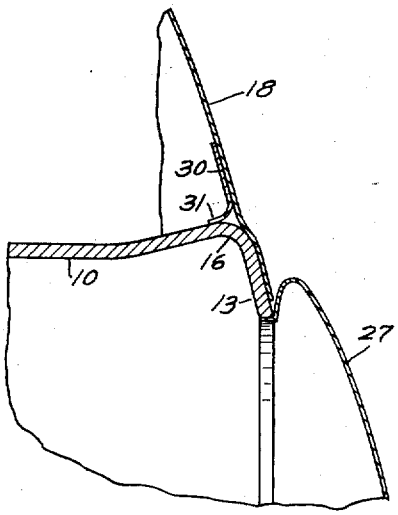
Fig. VI
INVENTORS
J Harold Hunt and
Harry J. Horn.
BY
Carroll R. Taber
THEIR ATTORNEY.

June 7, 1938. J H. HUNT ET AL Re. 20,750
VEHICLE WHEEL
Original Filed June 30, 1932 2 Sheets-Sheet 2
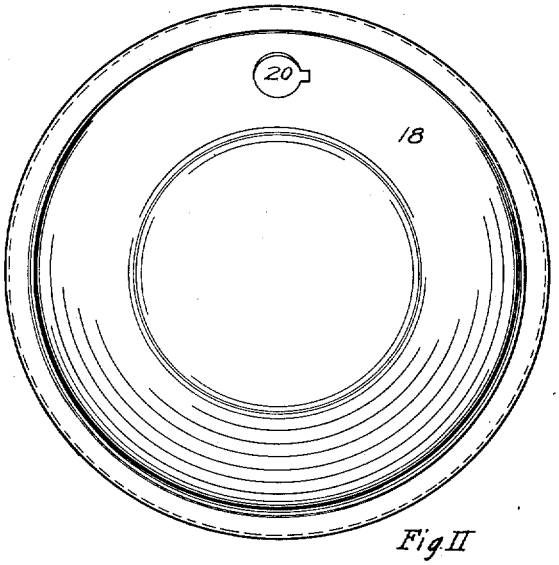
Fig. II
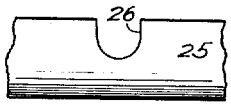
Fig. VII
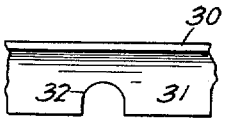
Fig. VIII
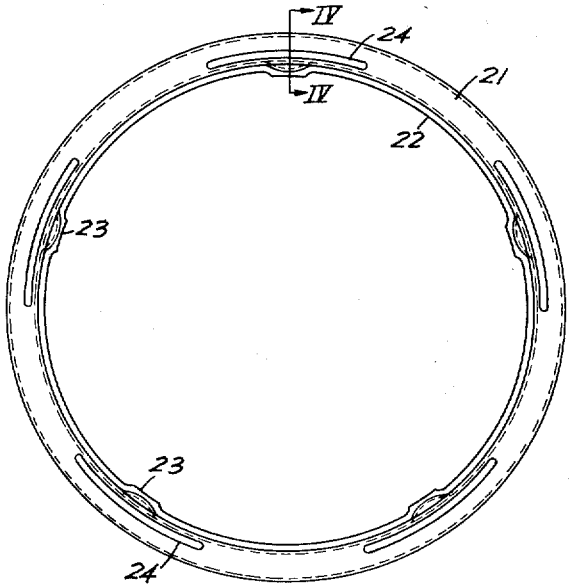
Fig. III
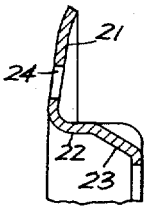
Fig. IV
INVENTORS
J Harold Hunt and
Harry J. Horn.
BY
Carroll R. Taber
THEIR ATTORNEY.

Reissued June 7, 1938

Re. 20,750

UNITED STATES PATENT OFFICE 20,750

VEHICLE WHEEL

J Harold Hunt and Harry J. Horn, Lansing, Mich., assignors, by mesne assignments, to George Albert Lyon, Detroit, Mich.

Original No. 1,993,061, dated March 5, 1935, Serial No. 620,064, June 30, 1932. Application for reissue July 16, 1936, Serial No. 90,936

11 Claims. (Cl. 301—37)

The present invention relates to vehicle wheels and more particularly to the combination with a vehicle wheel of a removable shield or cover plate for the same.

Shields or cover plates are used with vehicle wheels for the purpose of improving the appearance of the wheel. A light weight metal shield can be formed to provide any desired configuration within wide limits and can be finished in substantially any desired manner. The primary function of a wheel is to support the vehicle with which it is associated and it must necessarily be designed to accomplish this result. In producing wheels utility is of greater consideration than appearance. Accordingly shields are provided for vehicle wheels to supply the desired decorative effect without impairing the maximum utilitarian efficiency of the wheel.

Where decorative shields are used in combination with vehicle wheels it is desirable to make them removable whereby ready access may be had to the various parts of the wheel. Considerable difficulty has been experienced heretofore in providing suitable means for removably securing a shield to a vehicle wheel. Where some permanent securing means such as bolts or screws are used the cost of the assembly is materially increased and the facility with which the shield may be installed or removed is impaired. Difficulty is also experienced in removably securing shields to vehicle wheels in a manner whereby all objectionable rattles due to metallic contact between the wheel and shield are eliminated.

The principal objects of the present invention are the provision of resilient means for removably securing a shield to a vehicle wheel and the provision of non-metallic means for preventing intermittent contact between the shield and the vehicle wheel whereby objectionable noises are created.

An illustrative embodiment of the present invention is shown in the accompanying drawings, in which:

Figure I is a cross-sectional view of a vehicle wheel provided with a removable shield;

Figure II is a side view in elevation of the shield shown in Figure I;

Figure III is a side view in elevation of the securing ring carried by the shield shown in Figure I;

Figure IV is a cross-sectional view taken on substantially the line IV—IV of Figure III;

Figures V and VI are fragmentary sectional views of vehicle wheels illustrating modified forms of securing means for attaching the shield to the vehicle wheel;

Figure VII is a partial plan view of the securing means shown in Figure V; and

Figure VIII is a partial plan view of the securing means shown in Figure VI.

The vehicle wheel shown in Figure I as an illustrative embodiment of the present invention consists of a cylindrical hub shell 10, a wheel body 11 in the form of a curved disk secured to the hub shell 10, and a conventional drop center tire carrying rim 12 secured to the outer periphery of the disk 11. It should, of course, be understood that any other form of wheel body such as wood, wire or steel spokes may be utilized in place of the disk 11 if desired. Likewise, a conventional wheel felloe may be used in place of the rim 12 without departing from the spirit or scope of the present invention.

The hub shell 10 is provided with an inturned flange 13 at the front side thereof and with an inturned flange 14 at the rear side. Suitable openings 15 are formed in the flange 14 by means of which the hub shell 10 is secured to a wheel hub. The hub shell 10 is preferably formed with an enlarged portion indicated at 16 adjacent the front edge thereof whereby a decorative shield is secured thereto as will be described presently. The wheel disk 11 is secured to the hub shell 10 and the rim 12 respectively by rivets 17.

A substantially circular shield 18 of a diameter somewhat less than that of the shoulder portion 19 of the rim 12 is positioned against the side of the wheel with its peripheral portion within the annular shoulder portion 19 of the rim 12. As shown in Figures I and II the shield comprises a continuous circular sheet of metal which closes the opening formed at the front side of the hub shell 10 whereby the necessity for a hub cap is eliminated. A removable cap 20 closes a suitable opening in the shield 18 through which access is had to the tire valve forming a part of a pneumatic tire, not shown, adapted to be associated with the rim 12.

The shield 18 is removably secured to the vehicle wheel by means of a ring 21 preferably welded to the inner surface of the shield adjacent its central portion. A laterally extending portion 22 of the ring 21 is of slightly greater diameter than the enlarged portion 16 of the hub shell 10. As best shown in Figures III and IV, a plurality of depressions 23 are formed in the lateral portion 22 of the ring 21 to decrease the effective internal diameter of the portion 22 whereby the ring may be pressed into snug engagement with the external surface of the hub shell 10. An opening 24 is formed in the ring 21 immediately behind each of the depressions 23 whereby to increase the flexibility of the ring in that area to facilitate the installation and removal of the shield 18.

The structure shown in Figure V is a modified form of shield and securing means. In that structure the shield 18 is provided with a circular opening in the central portion thereof and the edge of the shield about the opening is bent inwardly and back upon itself to form a flange 29 enclosing one extremity of a ring 25. The laterally extending portion of the ring 25 is of a diameter slightly less than the external diameter of the enlarged portion 16 of the hub shell 10. Notches 26 are cut in the edge of the ring 25 at intervals about the circumference thereof whereby to increase the flexibility of the ring and to permit the same to be sprung sufficiently to pass over the enlarged portion 16 and to firmly engage the hub shell 10. Where a shield of the type shown in Figure V is used it is also necessary to provide a hub cap 27 for the opening at the front edge of the hub shell. As shown, the edge 28 of the cap preferably extends over the folded edge 29 of the shield 18 whereby to present a smooth appearance throughout the entire extent of the hub cap and shield 18.

In the modified structure shown in Figures VI and VIII the shield 18 is provided with a central opening of slightly greater diameter than the opening formed by the inturned flange 13 at the front side of the hub shell 10. A ring 30 having a portion parallel to the shield 18 and a laterally extending portion 31 is preferably welded to the shield 18 in concentric relation to the central opening formed therein. The internal diameter of the lateral portion 31 is slightly less than the external diameter of the enlarged portion 16 of the hub shell 10. The lateral portion 31 is preferably provided with a plurality of notches 32 at spaced intervals about the circumference thereof whereby that portion may be flexed sufficiently to pass over the enlarged portion 16 of the hub shell 10 and to engage snugly the external surface of the hub shell whereby to removably secure the shield thereto. The hub cap 27 closing the opening formed at the front side of the hub shell 10 preferably extends over the edge of the shield 18 defining the central opening therethrough.

While the securing ring 21 illustrated in Figures I, III and IV has been shown and described in connection with a continuous disk 18, it should be understood that it may also be used with a disk provided with a central opening therethrough, as illustrated in Figure VI. Likewise, the ring 30 illustrated in connection with the shield 18 having a central opening therethrough may also be used with a shield similar to that shown in Figures I and II, which is not provided with a central opening. Each of the securing devices heretofore described is adapted to removably secure the shield 18 to the hub shell 10.

The periphery of the shield 18 is preferably flanged as indicated at 33 and is positioned within the shoulder portion 19 of the rim 12. Rivets 34 are welded to the inner surface of the periphery of the shield 18 at spaced intervals. Nonmetallic caps 35 such as rubber, for example, provided with central openings therethrough are extended over the ends 36 of the rivets 34. The caps 35 are preferably cylindrical in shape and of considerably greater length than the rivets 36 whereby to prevent the periphery of the disk from contacting the rim 12 direct. In this manner a resilient non-metallic contact is provided between the periphery of the shield 18 and the rim 12 whereby all objectionable noises and rattles are eliminated. The shield is preferably formed as to contour whereby when the shield is secured to the hub the periphery of the shield presses the caps 35 firmly against the rim. The size of caps 35 and the manner in which they are secured to the shield may, of course, be varied to any desired extent, as long as they prevent the shield from contacting the rim.

From the foregoing description, it will be apparent that this invention provides means for removably securing a shield to a vehicle wheel hub and for preventing the periphery of the shield from contacting directly with the wheel rim. While only the preferred embodiments of the invention have been shown and described, it should be understood that the invention is not limited thereto but is coextensive with the scope of the appended claims.

We claim:

1. A vehicle wheel including in combination a substantially cylindrical hub shell, a wheel body secured to the hub shell, a rim member secured to the wheel body, a substantially circular shield disposed with its outer periphery adjacent the rim member, a central opening formed in the shield, the edge of the shield about the opening being bent inwardly to retain a ring adapted to engage the external surface of the hub shell whereby to removably secure the shield to the hub shell.

2. A vehicle wheel including in combination a substantially cylindrical hub shell, a wheel body secured to the hub shell, a rim member secured to the wheel body, a substantially circular shield disposed with its outer periphery adjacent the rim member, a central opening formed in the shield, the edge of the shield adjacent the central opening therethrough being bent back upon itself, and a ring provided with a laterally extending flange adapted to engage the external surface of the hub shell secured within the said flanged edge of the shield.

3. A vehicle wheel including in combination a substantially cylindrical hub shell, a wheel body secured to the hub shell, a rim member secured to the wheel body, a substantially circular shield disposed with its outer periphery adjacent the rim member, a central opening formed in the shield, the edge of the shield about the central opening formed therein being bent inwardly to retain a ring adapted to engage the external surface of the hub shell whereby to removably secure the shield to the hub shell, and a plurality of openings formed in the edge of the said ring whereby to increase the flexibility thereof.

4. The combination of a wheel including a drop center rim integrally connected to a central hub part adapted to be secured by bolts to a vehicle axle part, of an ornamental disk of relatively thin form-retaining sheet material having an apertured central portion engaged by a removable hub cap snapped into position in the aperture for concealing said bolts and means on the outer portion of the disk for yieldably contacting a portion of the wheel.

5. The combination with a wheel including a drop center rim integrally connected to a central hub part adapted to be secured by bolts to a vehicle axle part, of an ornamental disk of relatively thin form-retaining sheet material having a central portion formed to receive a closure, a closure cap for said disk engaging said central portion and concealing said bolts and means on the outer portion of the disk for yieldably contacting a portion of the wheel.

6. The combination with a wheel including a drop center rim integrally connected to a central hub part adapted to be secured by bolts to a vehicle axle part, of an ornamental disk of relatively thin form-retaining sheet material having a central portion formed to receive a closure, a closure cap for said disk engaging said central portion and concealing said bolts, and means on the outer portion of the disk for yieldably contacting a portion of the wheel, said means being concealed and being yieldably engaged with the wheel by the securing of the disk to the wheel.

7. The combination with a wheel including a drop center rim connected to a central hub part adapted to be secured by bolts to a vehicle axle part, of an ornamental disk of relatively thin form-retaining sheet material having an apertured central portion engaged by a hub cap over the aperture for concealing said bolts, and means on the outer portion of the disk for yieldably contacting a portion of the wheel, said hub cap extending clear across said aperture.

8. The combination with a wheel including a drop center rim connected to a central hub part adapted to be secured by bolts to a vehicle axle part, of an ornamental disk of relatively thin form-retaining sheet material having a central portion formed to receive a closure, a closure cap for said disk overlying said central portion and concealing said bolts, and resilient spring fingers for retaining said disk on the wheel, said fingers including a rigidly mounted base portion and each finger including a yieldable free portion disposed at substantially right angles to said base portion and extending in the direction of the axis of the wheel, said free portions of said fingers being cammed into disk retaining engagement upon axial pressure of the disk on the wheel.

9. In a wheel including a rim and a central part, an ornamental annular shell for disposition over said central part and provided with means for yieldably and detachably retaining it on the wheel, said shell having a central opening, and a closure cap disposed over said opening and in detachable engagement with the wheel, to overlap and engage the shell on the wheel, said shell being provided with resilient projections for holding the shell in position formed to slide back and forth on said central wheel part, and means on the outer portion of the shell for contacting a portion of the wheel.

10. In a wheel including a rim, a central part and a closure cap for detachable cooperation with said central part, an ornamental annular shell for disposition over said central part provided with means for yieldably and detachably retaining it on the wheel and having a central opening over which said closure cap is disposed in engagement with the shell, said shell means comprising resilient fingers for holding the shell in position formed to slide back and forth on said central wheel part, and means on the outer portion of the shell for contacting a portion of the wheel.

11. The combination with a wheel including a drop center rim, a central part adapted to be secured by bolts to a vehicle axle part, and a closure cap for detachable cooperation therewith to conceal said bolts of an ornamental annular shell of relatively thin form-retaining sheet material having a central portion formed to accommodate said closure cap and having resilient spring fingers for sliding engagement with said central part to retain said shell in position, and means on the outer portion of the disk for contacting a portion of the wheel.

J HAROLD HUNT.
HARRY J. HORN.